United States Patent
Johnson et al.

(10) Patent No.: US 10,851,832 B2
(45) Date of Patent: Dec. 1, 2020

(54) ROTARY GEARBOX

(71) Applicant: Caterpillar Inc., Deerfield, IL (US)

(72) Inventors: Adam J. Johnson, Taylorville, IL (US); Forrest Foster, Rapid City, SD (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 16/398,678

(22) Filed: Apr. 30, 2019

(65) Prior Publication Data
US 2020/0347879 A1 Nov. 5, 2020

(51) Int. Cl.
| | |
|---|---|
| F16C 19/38 | (2006.01) |
| F16H 57/021 | (2012.01) |
| E21B 3/02 | (2006.01) |
| F16C 33/78 | (2006.01) |
| F16L 17/02 | (2006.01) |

(52) U.S. Cl.
CPC ........ *F16C 19/386* (2013.01); *F16C 33/7813* (2013.01); *F16H 57/021* (2013.01); *E21B 3/02* (2013.01); *F16C 2226/62* (2013.01); *F16C 2226/76* (2013.01); *F16L 17/02* (2013.01)

(58) Field of Classification Search
CPC .. F16C 19/386; F16C 33/7813; F16C 33/743; F16C 35/063; F16C 57/022; F16C 2226/62; F16C 2226/76; F16C 2057/02069; F16C 57/021; F16C 57/22; E21B 3/02; F16H 2057/02039; F16L 17/02
USPC ................ 384/477, 481–482, 494, 548, 589; 475/333; 175/57, 324; 285/330; 74/420, 74/431, 606 R, 609, 640; 310/99
See application file for complete search history.

(56) References Cited

U.S. PATENT DOCUMENTS

| | | | | |
|---|---|---|---|---|
| 3,241,397 A | * | 3/1966 | Wilkinson | F16H 57/021 74/606 R |
| 4,770,548 A | | 9/1988 | Otto | |
| 5,053,661 A | * | 10/1991 | Kitamura | F16J 15/3232 277/565 |
| 5,823,541 A | | 10/1998 | Dietle et al. | |
| 5,875,690 A | * | 3/1999 | Cognigni | F16H 1/203 74/420 |
| 6,007,105 A | * | 12/1999 | Dietle | F16L 27/0828 277/559 |
| 6,872,161 B2 | * | 3/2005 | DiCarlo | F16H 1/46 29/893.1 |

(Continued)

FOREIGN PATENT DOCUMENTS

| | | |
|---|---|---|
| CN | 102878274 B | 8/2015 |
| CN | 105402322 A | 3/2016 |

(Continued)

*Primary Examiner* — Marcus Charles
(74) *Attorney, Agent, or Firm* — Calfee, Halter & Griswold LLP

(57) ABSTRACT

A rotary gear box for a rotary drill rig having a rotary joint that includes a first conduit having a first end portion defining an exit, a second conduit having a second end portion defining an inlet, and a sealing arrangement positioned radially between the first end portion of the first conduit and the second portion of the second conduit. The second conduit is rotatable relative to the first conduit and is arranged coaxial with the first conduit. The first end of the first conduit is received within the second end of the second conduit such that the exit of the first conduit is downstream from the sealing arrangement.

12 Claims, 6 Drawing Sheets

(56) References Cited

U.S. PATENT DOCUMENTS

| | | | | |
|---|---|---|---|---|
| 6,923,254 B2* | 8/2005 | Morrow | ............... | E21B 17/05 |
| | | | | 166/88.4 |
| 7,621,353 B2* | 11/2009 | Ishii | ............... | B60K 17/28 |
| | | | | 180/305 |
| 7,748,445 B2* | 7/2010 | Wells | ............... | E21B 3/02 |
| | | | | 166/77.1 |
| 8,505,924 B2 | 8/2013 | Dietle et al. | | |
| 8,757,023 B2* | 6/2014 | Ternovetsky | ............... | F16H 3/001 |
| | | | | 74/377 |
| 9,500,045 B2* | 11/2016 | Kuttel | ............... | E21B 17/07 |
| 9,879,771 B2* | 1/2018 | Campbell | ............... | F16H 57/023 |
| 10,538,978 B1* | 1/2020 | Du | ............... | E21B 21/02 |
| 2003/0032521 A1* | 2/2003 | Boston | ............... | F16C 21/00 |
| | | | | 475/331 |
| 2003/0185097 A1* | 10/2003 | Engel | ............... | F16C 19/54 |
| | | | | 366/331 |
| 2003/0205864 A1* | 11/2003 | Dietle | ............... | F04B 39/04 |
| | | | | 277/434 |
| 2008/0230274 A1 | 9/2008 | Stubstad | | |
| 2016/0290481 A1* | 10/2016 | Campbell | ............... | F16H 57/0436 |

FOREIGN PATENT DOCUMENTS

| | | | | |
|---|---|---|---|---|
| CN | 106122385 B | | 7/2018 | |
| FR | 2310165 A1 * | | 12/1976 | ............... B08B 9/08 |

* cited by examiner

ROTARY GEARBOX

TECHNICAL FIELD

The present disclosure relates generally to a rotary gearbox, and in particular, to a rotary gearbox for a rotary drill rig.

BACKGROUND

Conventional rotary drilling rigs include a rotary gearbox. The rotary gearbox typically includes a gear train mounted within the gearbox housing for transferring torque from a prime mover to a rotatable pipe. The rotary gearbox is movably mounted within the rotary drilling rig such that pull-down forces and pull-up forces are transferred through the gearbox housing to the rotatable pipe. The shear forces during pull-down and pull-up can cause bending and flexing of the gearbox housing, which can result in damage to the bolted joints connecting the gearbox housing to other portions of the drilling rig and result in damage to the gear train and bearings due to misalignment of the gear train.

The rotary gearbox also includes a swivel assembly for conducting pressurized fluid between a stationary pipe and a rotatable pipe. The swivel assembly defines a rotary joint (i.e., the interface between the stationary pipe and the rotatable pipe) that includes a sealing arrangement. The sealing arrangement for the rotary joint is a common area of wear and failure of the swivel assembly due to its exposure to abrasive material from the high-pressure flow of air, water, and debris through the rotary joint. Thus, rotary joints may include a complex sealing arrangement to provide adequate sealing.

For example, U.S. Pat. No. 6,007,105, entitled "Swivel Seal Assembly", discloses a swivel seal assembly for providing sealed high-pressure fluid communication between relatively rotatable generally coaxial conduits where a dynamic runout and static misalignment may occur to one conduit relative to the other. A generally tubular washpipe is mounted in pivotally articulating relation to one conduit, and a generally tubular seal housing is telescoped over the washpipe and mounted in pivotally articulating relation to the other conduit. High pressure, staged rotary seals are supported by the seal housing and maintain bearing and sealing engagement with the washpipe so that the seal housing and washpipe articulate in unison in response to said static misalignment and dynamic runout, thereby virtually eliminating relative lateral motion between the seal housing and washpipe and minimizing rotary seal extrusion damage.

SUMMARY

The disclosure describes, in one aspect, a rotary gear box for a rotary drill rig having a rotary joint that includes a first conduit having a first end portion defining an exit, a second conduit having a second end portion defining an inlet, and a sealing arrangement positioned radially between the first end portion of the first conduit and the second portion of the second conduit. The second conduit is rotatable relative to the first conduit and is arranged coaxially with the first conduit. The first end of the first conduit is received within the second end of the second conduit such that the exit of the first conduit is downstream from the sealing arrangement.

The disclosure describes, in another aspect, a rotary gearbox configured to mount to a guide of a rotary drill rig. The rotary gearbox includes a plurality of gears and a gearbox housing. The gearbox housing includes a gear train portion housing the plurality of gears and a mounting portion defining a mounting surface for mounting the gearbox housing to the guide. At least a majority of the mounting surface is spaced away from the gear train portion relative to a longitudinal axis of the rotary gearbox.

BRIEF DESCRIPTION OF THE DRAWINGS

Further features and advantages of the invention will become apparent from the description of embodiments using the accompanying drawings. In the drawings.

DETAILED DESCRIPTION

This disclosure relates to a rotary gearbox 100. In accordance with the present disclosure, the rotary gearbox 100 can be utilized in a variety of applications, such as for example, a rotary drill rig. The rotary gearbox 100 may include a rotary joint and features that extend the life of a sealing arrangement for the rotary joint. The rotary gearbox 100 may house a gear train and includes features that improve the load capacity of the rotary gearbox 100 as well as reducing deflection of the portion of the housing of the rotary gearbox that houses the gear train. Excessive deflection that can result in damage to the gears due to misalignment and damage to the bolted joints connecting the gearbox housing to other portions of the drilling rig.

Figure 1:
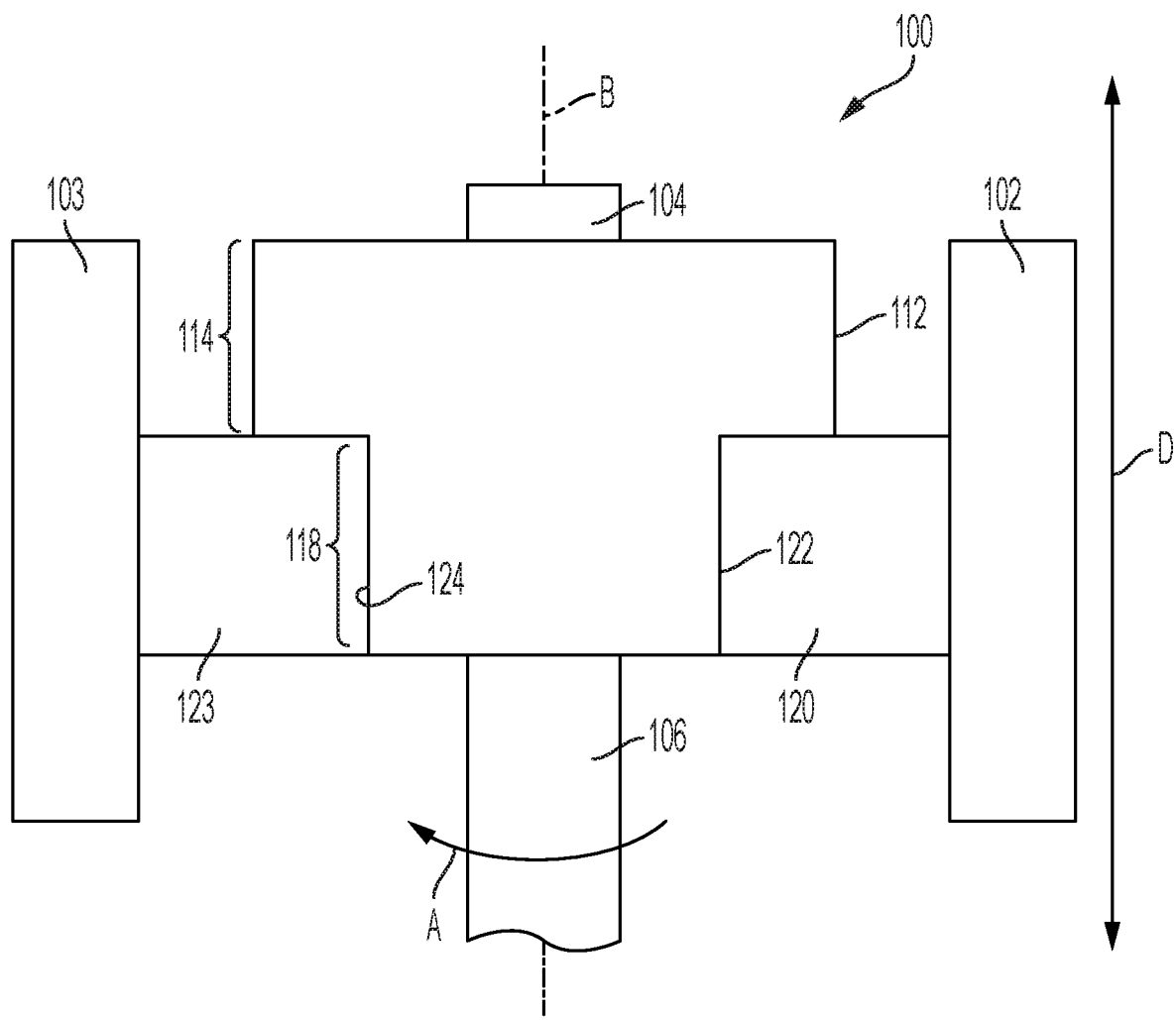
FIG. 1 is a schematic illustration of an exemplary embodiment of a rotary gearbox for a rotary drill where the rotary gear box is attached to drill rig guides.

FIG. 1 is a schematic illustration of an exemplary embodiment of the rotary gearbox 100 attached to one or more first guides 102 and one or more second guides 103 of a rotary drill rig. The rotary gearbox 100 may be configured to conduct a pressurized fluid, such as a liquid or gas, between a first conduit 104 and a second conduit 106 rotatable relative to the first conduit 104, as shown by arrow A, and arranged coaxial along a longitudinal axis B with the first conduit 104. The rotary gearbox 100 includes a sealing arrangement 110 (FIG. 3) to seal the rotary joint between the first conduit 104 and a second conduit 106.

The rotary gearbox 100 includes a gearbox housing 112 having a gear train portion 114 configured to house a gear train 116 (FIG. 2) of the rotary gearbox 100 and a mounting portion 118 configured for attaching the rotary gearbox 100 to the guides 102, 103 such that the guides may move the rotary gearbox upward (pull-up) and downward (pulldown) as shown by arrow D. In the illustrated embodiment, the mounting portion 118 is offset from, along the longitudinal axis B, the gear train portion 114 to at least partially isolate the gear train portion 114 from shear and bending forces transmitted to the gearbox housing 112 via the guides 102, 103 during operation of the rotary drill rig. In some embodiments, the mounting portion 118 may be axially spaced apart from the gear train portion 114 (i.e., vertically spaced apart in the orientation illustrated in FIG. 1). In other embodiments, however, a majority of the mounting portion 118 is spaced apart from the gear train portion 114 such that portion of the mounting portion 118 may axially overlap with a portion of the gear train portion 114.

The mounting portion 118 may be configured to attach to the guides 102, 103 in a variety of ways, such as for example, a bolted joint. Any suitable connection configuration may be used. In the illustrated embodiments, the mounting portion 118 includes one or more first mounting surfaces 122 and one or more second mounting surfaces 124. In the illustrated embodiment, the one or more first mounting surfaces 122 and the one or more second mounting surfaces 124 are below (along the longitudinal axis B) and underneath (radially relative to the longitudinal axis B) the gear train portion 112. One or more first spacers 120 may extend between the one or more first guides 102 and one or more first mounting surfaces 122 on the mounting portion 118 and one or more second spacers 123 may extend between the one or more second guides 103 and one or more second mounting surfaces 124 on the mounting portion 118. The one or more first and second spacers 120, 123 are configured to facilitate securely bolting the one or more first and second guides 102, 103 to the gearbox housing 112. In other embodiments, however, the one or more first and second guides 102, 103 may attach to the mounting portion 118 without the use of spacers.

Figure 2:
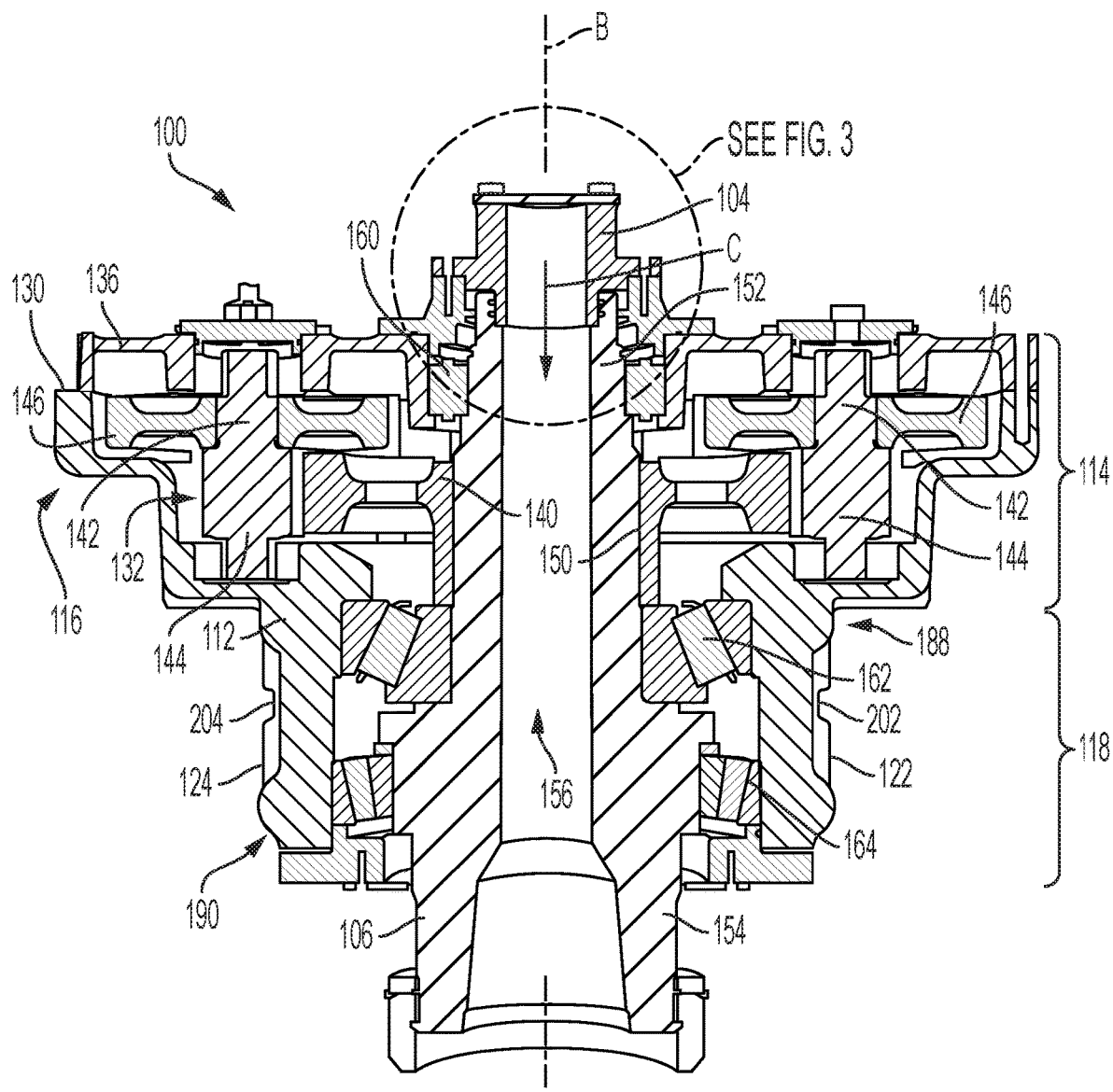
FIG. 2 is sectional view of the rotary gearbox of FIG. 1.

Referring to FIG. 2, the rotary gearbox housing 112 may be configured in a variety of ways. In the illustrated embodiment, the gear train portion 114 of the gearbox housing 112 is positioned above the mounting portion 118. The gear train portion 114 includes a planar top end 130 and forms a cavity 132, which is open at the top end 130. The cavity 132 is configured to house the gear train 116 of the rotary gearbox 100.

A top plate 136 may be mounted onto the top end 130 of the gear train portion 114 to cover the cavity 132. The top plate 136 may be attached to the top end 130 is any suitable manner. In the illustrated embodiment, the top plate 136 is bolted to the top end 130 to form a top bolted joint.

The gear train 116 may be configured in a variety of ways. Any gear train configuration that allows the transfer of rotational movement to the rotatable second conduit 106 may be used. For example, any suitable number of gears, type of gears, and arrangement of gears may be used. In the illustrated embodiment, the gear train 116 includes a gear train having a central gear 140 mounted within the gear train portion 114 to be rotatable about the longitudinal axis B. The drive train 116 may further includes a pair of outer gears 142 rotatably mounted within the gear train portion 114. The pair of outer gears 142 are arranged on opposite sides of the central gear 140. In the illustrated embodiment, each of the outer gears 142 is a compound gear having a lower gear 144 arranged to mate with the central gear 140 and a larger upper gear 146. The drive train 116 includes a pair of input gears (not shown). Each of the pair of input gears 148 is arranged to mate with a corresponding one of the upper gears 146 of the pair of outer gears 142. The pair of input gears (not shown) are configured to transfer power from a prime mover (not shown), such as for example, a hydraulic motor, to the outer gears 142.

The gear train 116 is configured to transfer the rotational motion from the prime mover (not shown) to the rotatable second conduit 106. The gear train 116 may engage the second conduit 106 in a variety of ways. In the illustrated embodiment, the second conduit 106 extends along the longitudinal axis B through a central opening 150 in the central gear 140. The central gear 140 is connected to the second conduit 106 such that the central gear 140 and the second conduit 106 rotate together. The central gear 140 may be connected to the second conduit 106 to rotate together by any suitable manner, such as for example, welding, a press fit, a splined connection, or other suitable connection.

In the illustrated embodiment, the second conduit 106 extends through the gear train portion 114 and through the mounting portion 118 of the rotary gearbox housing 112. The second conduit 106 includes a first end portion 152, a second end portion 154 opposite the first end portion 152, and a central passage 156 extending through the second conduit 106 from the first end portion 152 to the second end portion 154. The first end portion 152 defines an inlet for fluid flowing through the second conduit 106 in the flow direction shown by arrow C in FIG. 2. The second conduit 106 is positioned within the gearbox housing 112 such that the first end portion 152 extends from the gear train portion 114 of the gearbox housing 112 and the second end portion 154 extends from the mounting portion 118 of the gearbox housing 112.

The second conduit 106 may be rotatably mounted within the rotary gearbox housing 112 in any suitable manner. In the illustrated embodiment, the second conduit 106 is rotatably mounted within the rotary gearbox housing 112 by a plurality of roller bearings. The plurality of roller bearings may be configured in a variety of ways, such as for example, the number of roller bearings, the location of the roller bearings, and the type of roller bearings may vary in different embodiments.

In the illustrated embodiment, a first roller bearing 160 is arranged between the second conduit 106 and the gearbox housing 112, and/or the top plate 136, at or near the first end portion 152. The first roller bearing 160, in the illustrated embodiment, is a straight roller bearing. In other embodiments, however. the first roller bearing 160 may be otherwise configured, such as for example, a tapered roller bearing.

A second roller bearing 162 is arranged between the second conduit 106 and the gearbox housing 112 and positioned at or toward the middle of the gearbox housing 112 relative to the longitudinal axis B. In the illustrated embodiment, the second roller bearing 162 is arranged at or near the transition from the gear train portion 114 to the mounting portion 118 and the central gear 140 engages the second conduit 106 at a position along the longitudinal axis B that is between the first roller bearing 160 and the second roller bearing 162.

The second roller bearing 162 is a tapered roller bearing that is arranged to taper outward in a downward direction (i.e., a direction from the first end portion 152 of the second conduit 106 toward the second end portion 154). Thus, the second roller bearing 162 is considered the pull-down bearing since the outward taper positions the second roller bearing 162 to be exposed to a larger amount of the pull-down force of the drill rig than the other bearings.

A third roller bearing 164 is arranged between the second conduit 106 and the gearbox housing 112 and positioned at or near the second end portion 154 of the second conduit 106. The third roller bearing 164 is a tapered roller bearing that is arranged to taper inward in a downward direction (i.e., a direction from the first end portion 152 of the second conduit 106 toward the second end portion 154). Thus, the third roller bearing 164 is considered the pull-up bearing since the inward taper positions the third roller bearing 164 to be exposed to a larger amount of the pull-up force of the drill rig than the other bearings. In the other embodiments, the second roller bearing 162 and the third roller bearings 164 may not be tapered. Since the pull-down force of the drill rig is larger and typically is applied over a longer duration than the pull-up force, it is advantageous to have the second roller bearing 162 at or near the longitudinal middle of the gearbox housing 112 where there more of the housing structure surrounding and supporting the second roller bearing 162.

Figure 3:
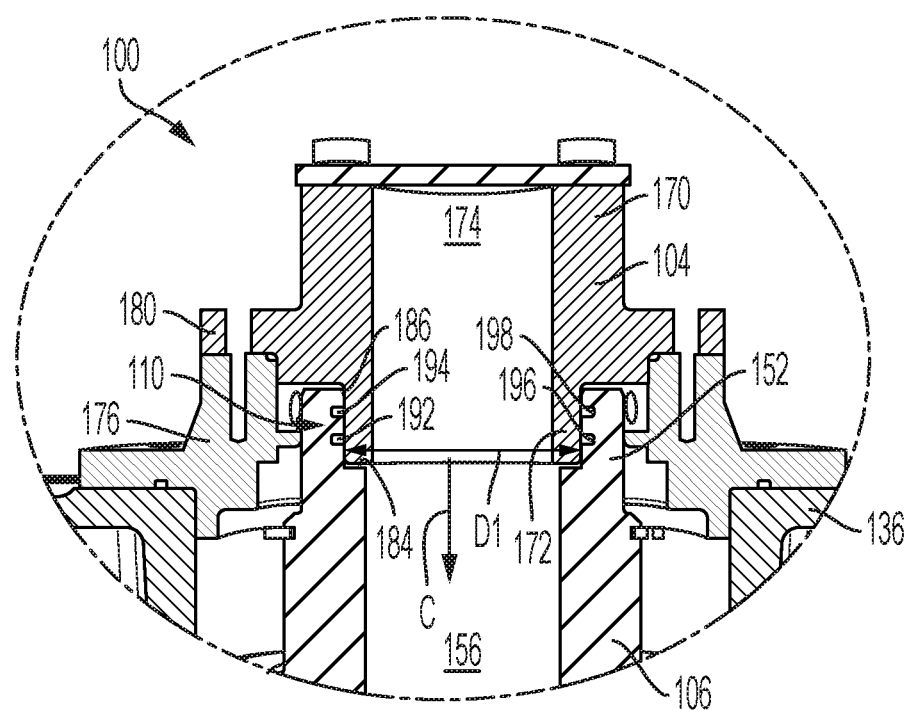
FIG. 3 is an enlarged sectional view of the rotary gearbox of FIG. 1 showing an exemplary embodiment of a rotary joint of the rotary gearbox.

Referring to FIG. 3, the interface between the first conduit 104 and the second conduit 106 forms a rotary joint. The rotary joint may be configured in a variety of ways. The rotary joint may include a variety of features configured to seal, and maintain a seal between the first conduit 104 and the second conduit 106. In the illustrated embodiment, the rotary gearbox 100 includes the sealing arrangement 110 and a piloting feature that results in flow exiting the first conduit 104 and entering the second conduit 106 downstream from the sealing arrangement 110.

In the illustrated embodiment, the first conduit 104 includes a first end portion 170, a second end portion 172 opposite the first end portion 170, and a passage 174 extending through the first conduit 104 from the first end portion 170 to the second end portion 172. The second end portion 172 defines an exit for fluid flowing through the first conduit 104 in the flow direction shown by arrow C. The first conduit 104 is configured to be mounted to the rotary gearbox housing 112 (FIG. 2) such that the second end portion 172 of the first conduit 104 is received within the first end portion 152 of the second conduit 106 and the passage 174 of the first conduit 104 is coaxial with the passage 156 of the second conduit 106.

In the illustrated embodiment, the first conduit 104 is mounted to the rotary gearbox housing 112 via a mounting ring 176 and the top plate 136. In particular, the first conduit 104 is mounted to the mounting ring 176 and the mounting ring 176 is mounted to the top plate 136. The first conduit 104, the mounting ring 176, and the top plate 136 may be mounted to each other in any suitable manner.

In the illustrated embodiment, the first conduit 104 is generally cylindrical and includes an attachment portion. The attachment portion may be configured in a variety of ways to attach the first conduit 104 to the gearbox housing 112. In the illustrated embodiments, the attachment portion is an exterior, annular flange 180 configured to facilitate bolting the first conduit 104 to the mounting ring 176. In the illustrated embodiment, the first conduit 104 is bolted to the mounting ring 176 and the mounting ring 176 is bolted to the top plate 136. In other embodiments, however, the first conduit 104 may be directly mounted to the gearbox housing 112 or to the top plate 136. The second end portion 172 of the first conduit 104 is configured to be received within the first end portion 152 of the second conduit 106 and has an outer diameter D1.

In the illustrated embodiment, the first end portion 152 of the second conduit 106 includes a counterbore defined by an outward facing shoulder 184 and a cylindrical inner side surface 186. The diameter of the cylindrical inner side surface 186 is slightly larger than the outer diameter D1 of the second end portion 172 of the first conduit 104. When the second end portion 172 is received within the counterbore of the first end portion 152 of the second conduit 106, the second end portion 172 abuts, or is adjacent, the shoulder 184. Thus, the second end portion 172 forms a piloting feature for the rotary joint. In the illustrated embodiment, the first conduit 104 is a single-piece with the piloting feature and the attachment portion being formed integrally. In other embodiments, however, the first conduit 104 may be formed from multiple components, such that, for example, the piloting feature and the attachment portion are separate parts.

The sealing arrangement 110 provides a fluid seal for the rotary joint. The sealing arrangement 110 may be configured in a variety of ways. Any suitable configuration may be used, including various number of seals, type of seals, location of seals, and orientation of seals. In the illustrated embodiment, a first seal 192 and a second seal 194 are positioned in the cylindrical inner side surface 186 of the first end portion 152 of the second conduit 106. The cylindrical inner side surface 186 includes a first annular groove 196 for receiving the first seal 192 and a second annular groove 198 for receiving the second seal 194. When the first seal 192 and the second seal 194 are mounted in the first annular groove 196 and the second annular groove 198, respectively, the first and second seal 192, 194 rotate with the second conduit 106. In other embodiments, however, the sealing arrangement 110 can include more or less than two seals and the seals may be mounted such that the seals do not rotate with the second conduit 106 (e.g., mounted in annular grooves located in the first conduit 104).

In the illustrated embodiment, the first seal 192 and the second seal 194 may be any suitable type of seals, including both energized seals (double acting or not) and/or non-energized seals. Suitable seals include, but are not limited to, an energized or non-energized radial face seal, a lip-type or double lip-type seal, a rubber static seal (e.g, O-ring, D-ring, elastomeric substance), a non-energized rubber seal, an energized rotational lip seal, a rotational laydown PTFE seal, a metal face seal, a packing/gland seal, an energized or non-energized PTFE seal, a low speed reciprocating seal, and a finger spring energized PTFE seal. The first seal 192 and the second seal 194 may be substantially identical. In other embodiments, however, the first seal 192 may be a different type of seal or may be arranged in a different orientation than the second seal 194. In another exemplary embodiment, the first seal 192 and/or the second seal 194 may be a radial lip seal. Any suitable radial lip seal may be used. For example, a conventional radial lip seal is generally U-shaped and forms an annular channel. In the embodiment utilizing one or more radial lip seals, the one or more lip seals are arranged such that the channel of the lip seal is facing downstream (i.e., toward the second end of the second conduit 106) such that any debris to which the lip seal is exposed, will tend to fall away from the channel by gravity and not be collected in the channel.

Since the first seal 192 and the second seal 194 are positioned in the cylindrical inner side surface 186 of the first end portion 152 of the second conduit 106, when the first conduit 104 is received in the first end portion 152 of the second conduit 106, fluid exits the second end portion 172 of the first conduit 104 downstream from the first seal 192 and the second seal 194.

Figure 4:
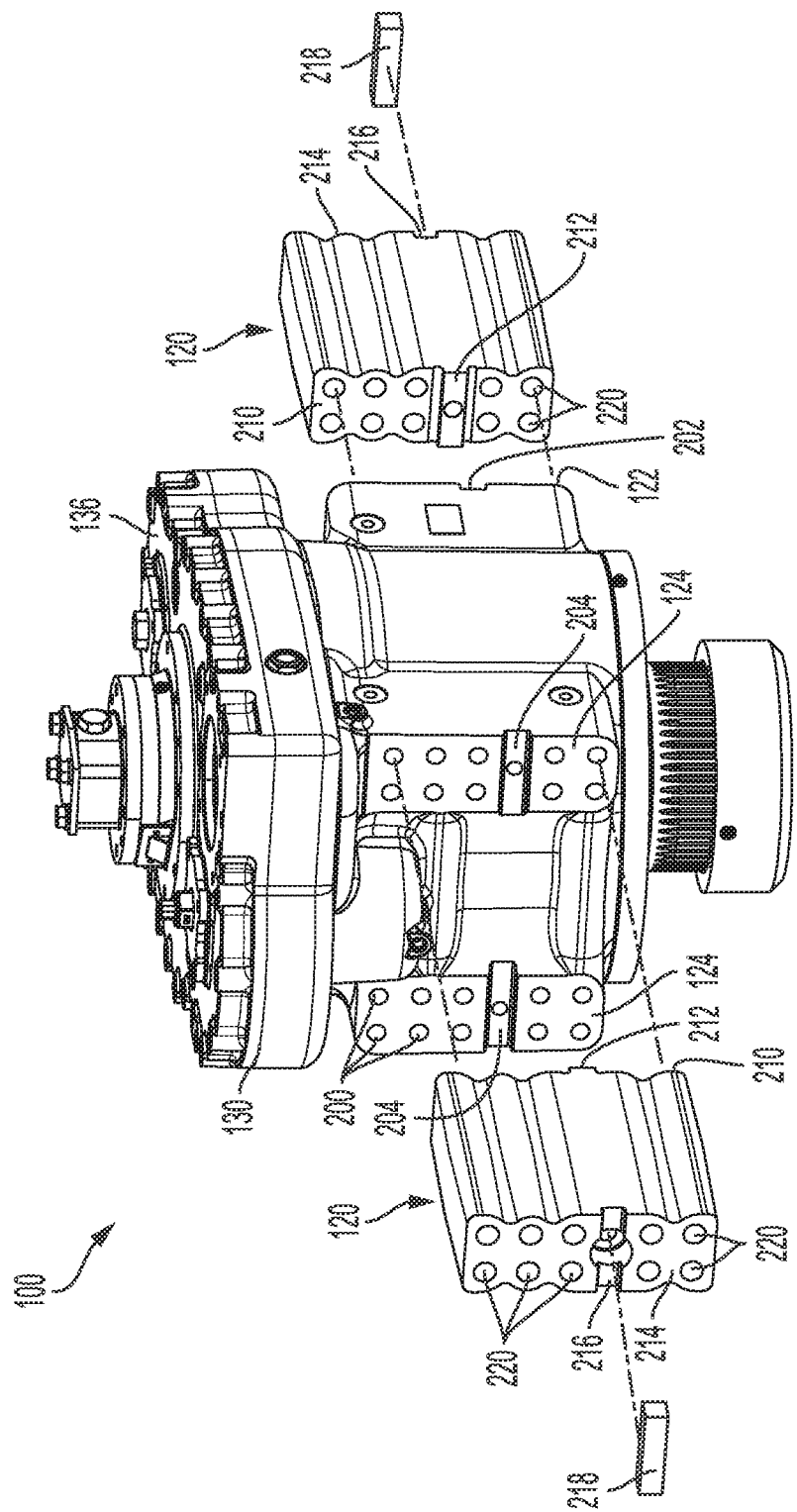
FIG. 4 is a perspective view of the rotary gearbox of FIG. 1.

Referring to FIGS. 2 and 4, in the illustrated embodiment, the mounting portion 118 is below (i.e., downstream along the longitudinal axis B) the gear train portion 114 to at least partially isolate the gear train portion 114 from shear and bending forces transmitted to the gearbox housing 112 via the mounting portion 118 during operation of the rotary drill rig. The mounting portion 118 may be configured in a variety of ways. In the illustrated embodiment, the mounting portion 118 includes a proximate end 188 and a distal end 190 opposite the proximate end 188.

In the illustrated embodiment, the mounting portion 118 includes two spaced apart, rectangular second mounting surfaces 124 and two spaced apart, rectangular first mounting surfaces 122 substantially similar to the second mounting surfaces 124 but positioned on the opposite side of the mounting portion 118 from the first mounting surfaces 122. In other embodiments, however, the mounting portion 118 may include more or less than two first mounting surfaces 122 and/or more or less than two second mounting surfaces.

In the illustrated embodiment, the two spaced apart first mounting surfaces 122 are coplanar and the two spaced apart second mounting surfaces 124 are coplanar. In other embodiments, however, the two spaced apart first mounting surfaces 122 may not be coplanar and the two spaced apart second mounting surfaces 124 may not be coplanar.

In the illustrated embodiment, the first mounting surfaces 122 and the second mounting surfaces 124 are radially outward and in-line with the second roller bearing 162 and the third roller bearing 164. Each of the first and second mounting surfaces 122, 124 include a plurality of mounting holes 200 for receiving bolts to attach the rotary gearbox 100 to the guides 102, 103. Thus, the rotary gearbox has first and second side bolted joints. The number and arrangement of the mounting holes 200 may vary for different embodiments.

The first and second mounting surfaces 122, 124 include structure that improves the shear strength of the side bolted joints and prevents relative rotation between the rotary gearbox 100 and the guides 102, 103. The structure that improves the shear strength and prevents rotation can be configured in a variety of ways. In the illustrated embodiment, the first mounting surfaces 122 include a first keyway 202 that extends across both first mounting surfaces 122. Further, the second mounting surfaces 124 include a second keyway 204 that extends across both the second mounting surfaces 124. In the illustrated embodiment, each of the first keyway 202 and the second keyway 204 is formed as a linear groove that extend horizontally and coaxially across both the first mounting surfaces 122 and across both of the second mounting surfaces 124, respectively (i.e., perpendicular to the longitudinal axis B). In other embodiments, however, the first and second keyways 202, 204 can extend other than horizontally, such as for example, at any angle transverse to the longitudinal axis B that is not perpendicular. In the illustrated embodiment, one or more of the mounting holes 200 is located within the keyways 202, 204.

In the illustrated embodiment, each of the one or more first spacers 120 is configured to be bolted between one of the first mounting surfaces 122 and one of the first guides 102. Similarly, each of the one or more second spacers 123 is configured to be bolted between one of the second mounting surfaces 124 and one of the second guides 103.

In the illustrated embodiment, four spacers 120, 123 are used to connect the gearbox housing 112 to the guides 102, 103. In particular, a first spacer 120 is connected to one of the first mounting surfaces 122 and another first spacer 120 is connected to the other of the two first mounting surfaces 122. Similarly, a second spacer 123 is connected to one of the second mounting surfaces 124 and another second spacer 123 is connected to the other of the two second mounting surfaces 124. In other embodiments, the number of first mounting surfaces 122, the number of second mounting surfaces 124, and the number of spacers 120, 123 may vary in different embodiments. For example, in some embodiments the guides 102, 103 may attach to the mounting portion 118 without the use of spacers 120, 123. Further, in some embodiments, a single spacer may attach to multiple mounting surfaces or multiple spacers may attach to a single mounting surface. Any suitable number of spacers and mounting surfaces may be used to connect the gearbox housing 112 to the guides 102, 103.

In the illustrated embodiment, the one or more first spacers 120 are identical to the one or more second spacers 123 and the first spacers 120 and the second spacers 123 may be used interchangeably. Thus, in FIG. 4, the spacers are referred to and described as first spacers 120. In other embodiments, however, the first spacers 120 and the second spacers 123 may differ and the first mounting surfaces 122 and the second mounting surfaces 124 may be configured differently.

Referring to FIG. 4, the first spacer 120 includes a first mating surface 210 configured to engage the first mounting surface 122 or the second mounting surface 124 of the mounting portion 118. The first mating surface 210 may be shaped similar to the first mounting surface 122, such as for example, a similar or same rectangular shape as the first mounting surface 122. The first mating surface 210 includes a key 212 configured to be received in the keyway 202 of one of the first mounting surfaces 122 or in the keyway 204 of one of the second mounting surfaces 122. In the illustrated embodiment, the key 212 is formed as a horizontal ridge that is complementary to the horizontal groove keyway 202, 204. In one exemplary embodiment, the key 212 is configured to be received with one of the keyways 202, 204 via a press-fit. The key 212 and the keyways 202, 204 can be any suitable shape, size, or orientation that allows the key/keyway combination to improve the shear strength of the side bolted joints and prevent relative rotation between the rotary gearbox 100 and the guides 102, 103. In other embodiments, the first mating surface 210 may include a keyway configured to receive a key of one of the first mounting surfaces 122 or one of the second mounting surfaces 122.

The first spacer 120 includes a second mating surface 214 configured for mounting to one or more of the guides 102, 103. The second mating surface 214 is opposite the first mating surface 210. The second mating surface 214 may be configured in any suitable manner to mount to one or more of the guides 102, 103. In the illustrated embodiment, the second mating surface 214 has a similar rectangular shape as the first mating surface 210. While the first mating surface 210 has the key 212, the second mating surface 214 has a keyway 216. The keyway 216 is configured to receive a guide key 218 associated with the guides 102, 103. The guide key 218 can be configured in a variety of ways. Any configuration that can be received within the keyway 216 to improve the shear strength of the side bolted joints and prevent relative rotation between the rotary gearbox 100 and the guides 102, 103 may be used.

In the illustrated embodiment, the guide key 218 is a generally rectangular or oblong bar or projection that is sized to be received in the keyway 216 and span the length of the keyway 216 on the first spacer 120. In one exemplary embodiment, the guide key 218 is configured to be received with keyway 216 via a press-fit. The guide keyway 216 may be a separate component or integrally formed with the guide 102, 103 or another component. In other embodiments, the second mating surface 214 may include a key configured to be received in a keyway of the guide 102, 103 or a component associated with the guide.

The first spacers 120 and the second spacers 123 include a plurality of through bores 220 that extend through the first spacers 120 from the first mating surface 210 to the second mating surface 214. In the illustrated embodiment, at least one through bore 220 extends from the keyway 216 through the first spacer 120 and through the key 212. The through bores 220 are arranged to align with the mounting holes 200 in the first mounting surface 122 or the second mounting surface 124 such that bolts (not shown) that extend through the through bores will engage with the mounting holes 200 in the gearbox housing 112.

Figure 5:
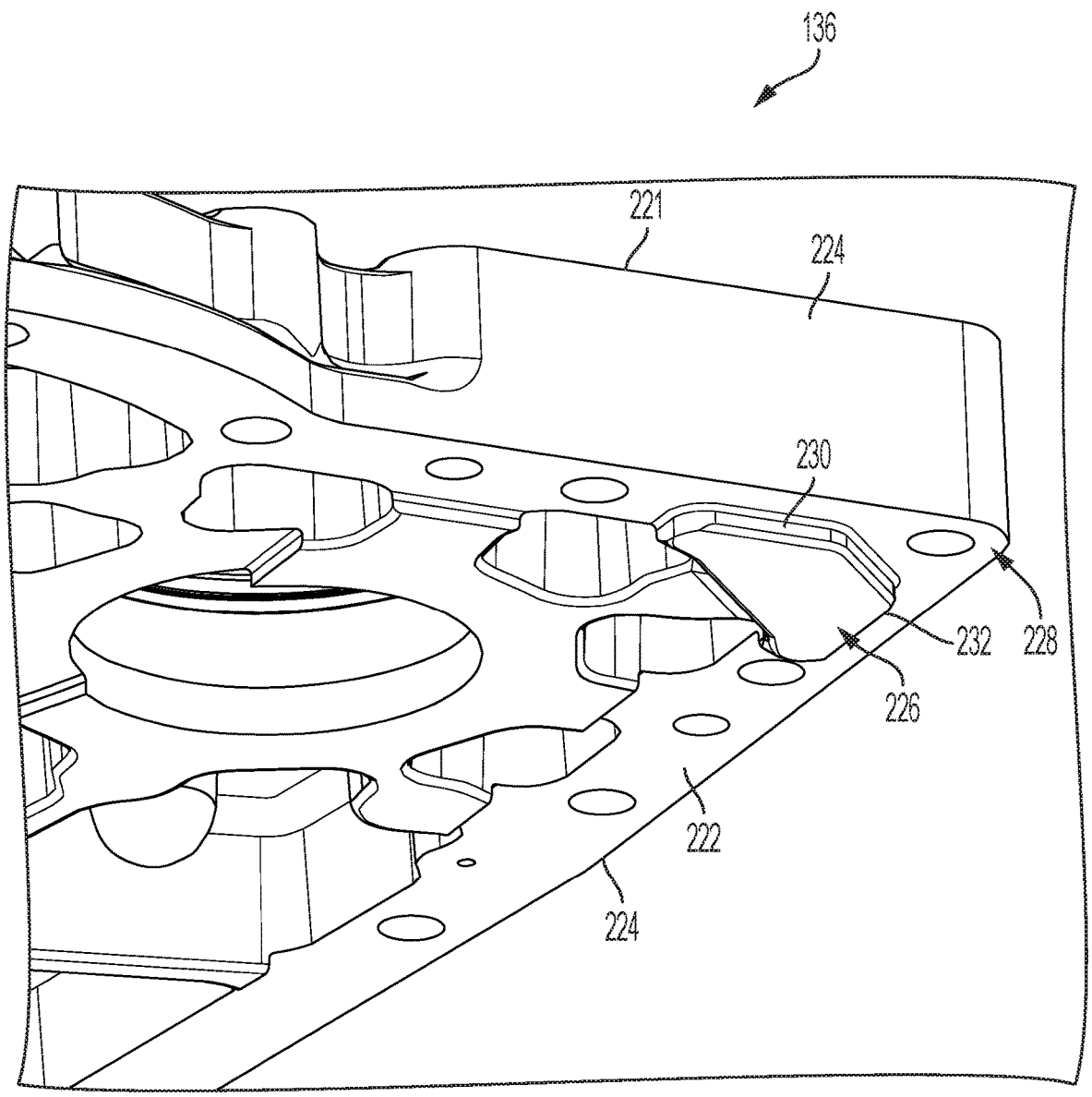
FIG. 5 is an enlarged view of the underside of an exemplary embodiment of a top plate for the rotary gearbox of FIG. 1.
Figure 6:
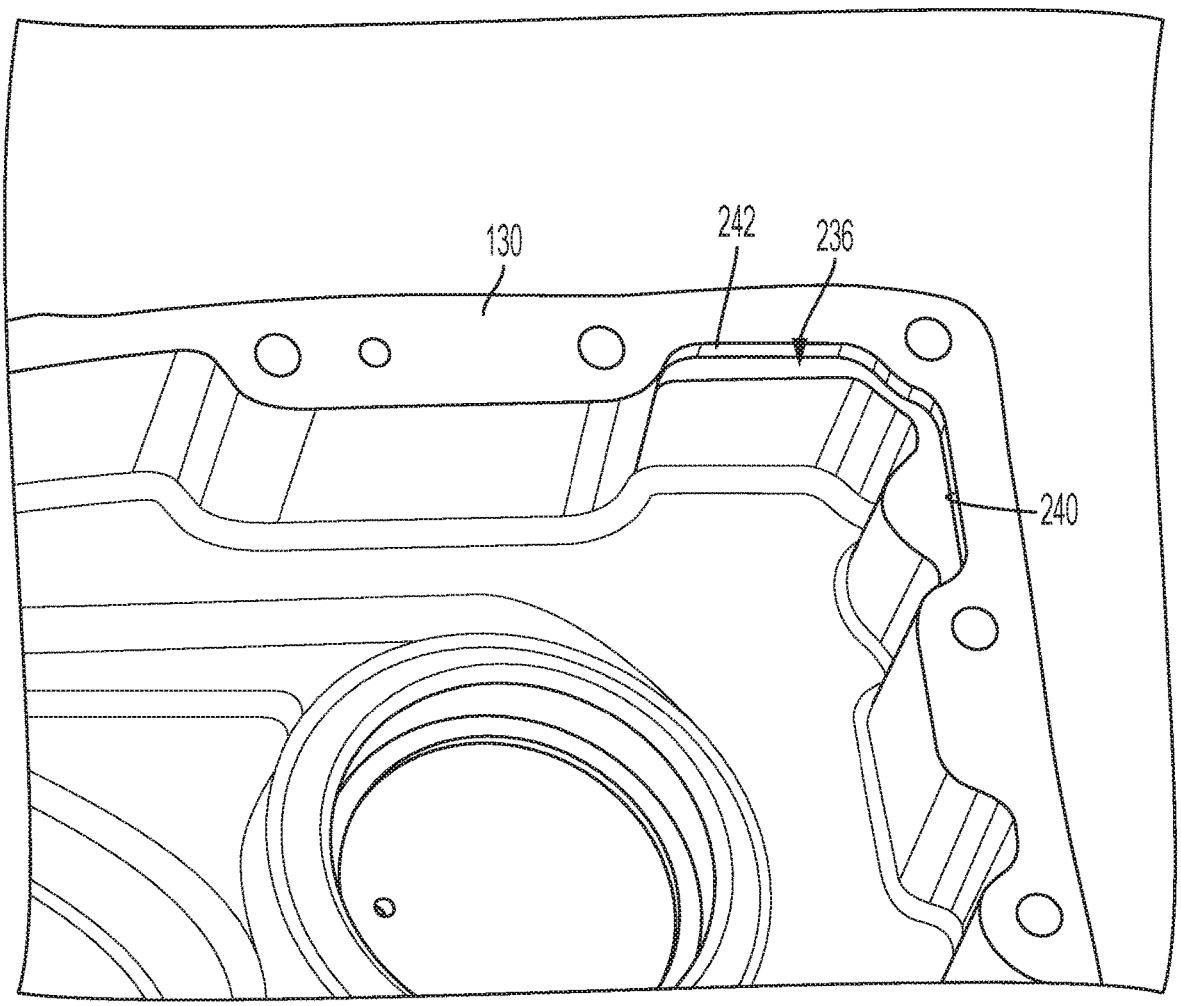
FIG. 6 is an enlarged view of the top end of an exemplary embodiment of a gearbox housing for the rotary gearbox of FIG. 1.

Referring to FIGS. 5-6, the top plate 136 includes a top surface 221, a bottom surface 222 generally parallel to and opposite the top surface 221, and a plurality of side surfaces 224 extending between the top surface 221 and the bottom surface 222. In the illustrated embodiment, the top plate 136 is generally rectangular with four side surfaces 224. In other embodiments, however, the top plate 136 can be configured in any suitable shape having more or less than four side surfaces 224.

The bottom surface 222 includes one or more projections 226 that align or locate the top plate 136 with the top end 130 of the rotary gearbox housing 112 and improve the shear strength of the top bolted joint (i.e., where the top plate 136 is bolted to the top end 130) and help with alignment of the gear train 116 and rotary joint. The one or more projections 226 may be configured in a variety of ways. Any suitable shape, size, location, and number of projections may be used. In the illustrated embodiment, the bottom surface 222 includes one of the one or more projections 226 adjacent a corner 228 between two of the side surfaces 224. In one exemplary embodiment, the bottom surface 222 includes a projection 226 at two opposing corners between the side surfaces 224.

In the illustrated embodiment, the projection 226 includes a first engagement surface 230 the extends parallel one of the side surfaces 224 and a second engagement surface 232 that extends parallel to another of the side surfaces 224 and generally perpendicular to the first engagement surface 230.

Referring to FIG. 6, the gearbox housing 112 includes one or more recesses 236 adjacent the top end 130 of the gear train portion 114. Each of the one or more recesses 236 is configured to receive and cooperate with a corresponding one of the projections 226. The one or more recesses 236 may be configured in a variety of ways. Any suitable shape, size, location, and number of projections that can cooperate with the projections 226 to align or locate the top plate 136 with the top end 130 of the rotary gearbox housing 112 and improve the shear strength of the top bolted joint may be used.

In the illustrated embodiment, one of the one or more recess 236 is provided for each of the corresponding projections 226. The recess 236 includes a first shoulder 240 that extends parallel to and engages the first engagement surface 230 and a second shoulder 242 that extends parallel to and engages the second engagement surface 232.

INDUSTRIAL APPLICABILITY

The disclosure is applicable to a system having a rotary joint, and in particular to rotary gearboxes for rotary drill rigs. In an exemplary embodiment of the disclosed rotary gearbox 100, the rotary gearbox 100 includes features that extend the life of the sealing arrangement for the rotary joint. In an exemplary embodiment, the rotary gearbox 100 includes a piloting feature with respect to the rotary joint where the exit of the first conduit 104 is received within the inlet of the second conduit 106. As a result, flow exiting the first conduit 104 enters the second conduit 106 downstream from the seal arrangement 110. As such, the dynamic pressure of the fluid flowing through the conduits 104, 106 does not force the fluid, and any debris in the fluid that can degrade the life of the sealing arrangement, into the sealing arrangement.

In an exemplary embodiment, the sealing arrangement 110 may include multiple annular seals 192, 194 arranged in series and mounted to rotate with the second conduit 106 during operation. Having more than one annular seal provides additional sealing layers to extend the life of the sealing arrangement 110.

In an exemplary embodiment, the rotary gearbox 100 includes features that improve the load capacity of the rotary gearbox 100 and reduce deflection of the gear train portion 114 during pull-up and pull-down operation of the rotary drill rig. In an exemplary embodiment, gearbox housing 112 is mounted to the guides 102, 103 at a location where the pull-up and pull-down forces during operation do not cause excessive deflection of the gearbox housing 112, which can result in damage to the gears and bearings due to misalignment of the gear train.

For example, in the illustrated embodiment, all of, or at least a majority of, the mounting portion 118 is spaced away from the gear train portion 114. As a result, the pull-up and pull-down forces are at least partially isolated from the gear train portion 114 of the gearbox housing 112 and deflection of the gear train portion 114 is reduced.

In an exemplary embodiment, the rotary gearbox 100 also includes a three-roller bearing design. The first roller bearing 160 is positioned at and supports the first end portion 152 of the second conduit 106. In the illustrated embodiment, the second and the third roller bearings 162, 164 are positioned in the mounting portion 118 (i.e., spaced away from the gear train portion 114) such that the first mounting surfaces 122 and the second mounting surfaces 124 are radially aligned with the second roller bearing 162 and the third roller bearing 164. As a result, the strain caused by the pull-up and pulldown forces is transmitted directly through the mounting portion 118 and the second and third roller bearings 162, 164 without significantly affecting the gear train 116.

The second roller bearing 162 is positioned toward the middle of the gearbox housing 112 and tapers outward to absorb a larger amount of the pull-down force of the drill rig than the other bearings. Since the pull-down force of the drill rig is larger and typically is applied over a longer duration than the pull-up force, it is advantageous to position the second roller bearing 162 at or near the longitudinal middle of the gearbox housing 112, where there more of the housing structure surrounding and supporting the second roller bearing 162.

The third roller bearing 164 is positioned at or toward the second end portion 154 of the second conduit and tapers inward in the direction of flow through the passage 156. Thus, since the second and third roller bearings 162, 164 are positioned below the gear train portion 114, the shear forces transmitted through the second and third roller bearings 162, 164 are at least partially isolated from the gear train portion 114.

In an exemplary embodiment, the side bolted joints that attach the gearbox housing 112 to the guides 102, 103 include a key and keyway (or slot and ledge) feature that improves the shear strength of the bolted joint and also prevents relative rotation between the gearbox housing 112 to the guides 102, 103. In one exemplary embodiment, the side bolted joints include spacers that incorporate the key and keyway features along with the gearbox housing 112.

In an exemplary embodiment, the projection 226 and recess 236 define a piloting feature that locates the top plate 136 relative to the top end 130 of the gearbox housing 112.

The interaction between the projection 226 and the recess 236 also improves the shear strength the top bolted joint and helps with the alignment of the gear train 116 and the rotary joint.

It will be appreciated that the foregoing description provides examples of the disclosed system. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

ELEMENT LIST

Number Name 100 rotary gearbox
102 first guides
103 second guides
104 first conduit
106 second conduit
110 sealing arrangement
112 gearbox housing
114 gear train portion
116 gear train
118 mounting portion
120 first spacers
122 first mounting surfaces
123 second spacers
124 second mounting surfaces
130 top end
132 cavity
136 top plate
140 central gear
142 outer gears
144 lower gear
146 upper gear
150 central opening
152 first end portion
154 second end portion
156 central passage
160 first roller bearing
162 second roller bearing
164 third roller bearing
170 first end portion
172 second end portion
174 passage
176 mounting ring
180 exterior annular flange
184 outward facing shoulder
186 inner side surface
188 proximate end
190 distal end
192 first seal
194 second seal
196 first annular groove
198 second annular groove
200 mounting holes
202 first keyway
204 second keyway
210 first mating surface
212 key
214 second mating surface
216 keyway
218 guide key
220 bores
221 top surface
222 bottom surface
224 side surfaces
226 projections
228 corner
230 first engagement surface
232 second engagement surface
234 third engagement surface
236 recesses
240 first shoulder
242 second shoulder
244 third shoulder

What is claimed is:

1. A rotary gearbox for a rotary drill rig, the rotary gearbox configured to mount to a guide of the rotary drill rig, the rotary gearbox comprising:
    a plurality of gears; and
    a gearbox housing comprising:
        a gear train portion housing the plurality of gears; and
        a mounting portion defining a mounting surface for mounting the gearbox housing to the guide,
        wherein at least a majority of the mounting surface is spaced away from the gear train portion relative to a longitudinal axis of the rotary gearbox,
        wherein the mounting surface includes a keyway extending transverse to the direction of the longitudinal axis, and
        wherein a spacer extends between the mounting surface and the guide and the spacer includes a key configured to be received within the keyway.

2. The rotary gearbox of claim 1, wherein the spacer is bolted between the guide and the gearbox housing.

3. A rotary gearbox for a rotary drill rig, the rotary gearbox configured to mount to a guide of the rotary drill rig, the rotary gearbox comprising:
    a plurality of gears; and
    a gearbox housing comprising:
        a gear train portion housing the plurality of gears; and
        a mounting portion defining a mounting surface for mounting the gearbox housing to the guide,
        wherein at least a majority of the mounting surface is spaced away from the gear train portion relative to a longitudinal axis of the rotary gearbox, wherein the mounting surface includes a keyway extending transverse to the direction of the longitudinal axis, and further comprising a second mounting surface spaced apart from and coplanar with the mounting surface, and wherein the keyway extends across both the mounting surface and the second mounting surface.

4. The rotary gearbox of claim 3, wherein a first spacer extends between the mounting surface and the guide and the first spacer includes a key configured to be received within the keyway in the mounting surface, and wherein a second spacer extends between the second mounting surface and the guide and the second spacer includes a second key configured to be received within the keyway in the second mounting surface.

5. The rotary gearbox of claim 4, further comprising a third mounting surface opposite the mounting surface and a fourth mounting surface opposite the second mounting surface, wherein the third mounting surface is spaced apart from and coplanar with the fourth mounting surface, wherein a second keyway extends across both the third mounting surface and the fourth mounting surface.

6. A rotary gearbox for a rotary drill rig, the rotary gearbox configured to mount to a guide of the rotary drill rig, the rotary gearbox comprising:
a plurality of gears; and
a gearbox housing comprising:
a gear train portion housing the plurality of gears; and
a mounting portion defining a mounting surface for mounting the gearbox housing to the guide,
wherein at least a majority of the mounting surface is spaced away from the gear train portion relative to a longitudinal axis of the rotary gearbox; and
a first conduit fixably attached relative to the gearbox housing and having a first end portion defining an exit;
a second conduit extending at least partially through the gearbox housing, the second conduit having a second end portion defining an inlet, the second conduit being rotatable relative to the first conduit and the gearbox housing, and arranged coaxially with the first conduit, wherein the first end of the first conduit is received within the second end portion of the second conduit; and
a sealing arrangement positioned radially between the first end portion of the first conduit and the second portion of the second conduit,
wherein the exit of the first conduit is downstream from the sealing arrangement.

7. The rotary gearbox of claim 6, wherein the sealing arrangement is mounted to rotate with the second conduit.

8. The rotary gearbox of claim 6, wherein the sealing arrangement is mounted in the second end of the second conduit.

9. The rotary gearbox of claim 6, wherein the sealing arrangement includes a plurality of annular seals arranged in series.

10. The rotary gearbox of claim 6, further comprising:
a first roller bearing mounted within the gearbox housing adjacent the second end portion of the second conduit;
a second roller bearing mounted within the gearbox housing adjacent a distal end of the mounting portion; and
a third roller bearing mounted within the gearbox housing between the first roller bearing and the second roller bearing.

11. The rotary gearbox of claim 10, wherein the first roller bearing is mounted within the gear train portion of the gearbox housing and the second and third roller bearings are mounted within the mounting portion of the gearbox housing.

12. The rotary gearbox of claim 10, wherein the second roller bearing is configured as a pull-up bearing and the third roller bearing is configured as a pull-down bearing.

* * * * *